United States Patent
Hamada et al.

(10) Patent No.: US 9,277,134 B2
(45) Date of Patent: Mar. 1, 2016

(54) IMAGE PICKUP APPARATUS AND IMAGE PICKUP METHOD

(71) Applicant: Olympus Corporation, Shibuya-ku, Tokyo (JP)

(72) Inventors: Takashi Hamada, Hachioji (JP); Akira Yukitake, Kokubunji (JP); Masaomi Tomizawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/512,681

(22) Filed: Oct. 13, 2014

(65) Prior Publication Data
US 2015/0237262 A1 Aug. 20, 2015

(30) Foreign Application Priority Data
Feb. 18, 2014 (JP) ................................. 2014-028753

(51) Int. Cl.
| | |
|---|---|
| *H04N 5/222* | (2006.01) |
| *H04N 5/228* | (2006.01) |
| *H04N 5/235* | (2006.01) |
| *G03B 7/00* | (2014.01) |
| *G03B 13/10* | (2006.01) |
| *G03B 17/20* | (2006.01) |
| *G03B 17/18* | (2006.01) |
| *G03B 13/02* | (2006.01) |
| *G03B 13/30* | (2006.01) |
| *H04N 5/232* | (2006.01) |

(52) U.S. Cl.
CPC .......... *H04N 5/23293* (2013.01); *H04N 5/2353* (2013.01)

(58) Field of Classification Search
CPC .......... H04N 5/23293; H04N 5/23212; H04N 5/23296; H04N 5/2353; G03B 17/20; G03B 13/02

USPC ......... 348/333.01–333.13, 222.1, 229.1, 362; 396/141, 147–152, 232, 296, 373–386
See application file for complete search history.

(56) References Cited

U.S. PATENT DOCUMENTS

| | | | | |
|---|---|---|---|---|
| 5,557,358 | A * | 9/1996 | Mukai et al. | 396/296 |
| 7,415,203 | B2 * | 8/2008 | Lee | 396/233 |
| 8,872,957 | B2 * | 10/2014 | Jogetsu | 348/333.09 |
| 2009/0303374 | A1 * | 12/2009 | Ueda et al. | 348/333.08 |
| 2010/0208108 | A1 * | 8/2010 | Nakahira | 348/248 |
| 2011/0267526 | A1 * | 11/2011 | Ishihara et al. | 348/333.01 |
| 2012/0154660 | A1 * | 6/2012 | Hirayama | 348/333.01 |
| 2014/0002709 | A1 * | 1/2014 | Sakurabu | 348/333.09 |
| 2014/0333819 | A1 * | 11/2014 | Aoki | 348/333.09 |
| 2015/0092098 | A1 * | 4/2015 | Konishi | 348/333.11 |
| 2015/0130982 | A1 * | 5/2015 | Misawa | 348/333.08 |

\* cited by examiner

FOREIGN PATENT DOCUMENTS

JP 2004-173263 6/2004

*Primary Examiner* — Chia-Wei A Chen
(74) *Attorney, Agent, or Firm* — John C. Pokotylo; Straub & Pokotylo

(57) ABSTRACT

Provided is an image pickup apparatus including an image pickup device, an AE control section, an image pickup control section that makes the image pickup device perform shooting, an EVF for image observation by looking thereinto, and an electronic display section, the electronic display section and the EVF alternatively displaying an image, wherein in exposure control, the AE control section sets a first exposure condition that is the same as an exposure condition for capturing image data for recording when the image is displayed on the electronic display section, and sets a second exposure condition that is different from the first exposure condition when the image is displayed on the EVF.

4 Claims, 5 Drawing Sheets

IMAGE PICKUP APPARATUS AND IMAGE PICKUP METHOD

CROSS REFERENCE TO RELATED APPLICATION

This application claims benefit of Japanese Application No. 2014-028753 filed in Japan on Feb. 18, 2014, the entire contents of which are incorporated herein by this reference.

BACKGROUND OF THE INVENTION

1. Field of the Invention

The present invention relates to an image pickup apparatus including a plurality of display sections for observing an image, and an image pickup method in the image pickup apparatus.

2. Description of the Related Art

There are some image pickup apparatuses, such as digital cameras and digital video cameras, including a plurality of display sections for observation an image, and such image pickup apparatuses sometimes include, for example, an electronic display section, such as a crystal-liquid display apparatus, for observing an image from a distant position without looking thereinto and an electronic viewfinder for observing an image by looking thereinto to see the image through, e.g., an eyepiece lens.

As an example of such image pickup apparatuses, Japanese Patent Application Laid-Open Publication No. 2004-173263 describes a digital camera including an electronic viewfinder for looking at an image therethrough and a crystal-liquid monitor that enables an image to be viewed from the outside, which are display sections for observing an image to be recorded or a recorded image. This digital camera is connectable to an external device via a connection portion such as a USB, and upon detection of connection to an external device, the mode transitions to a transfer mode, whereby display is switched from the electronic viewfinder to the crystal-liquid monitor to improve the convenience when the external device is connected to the digital camera.

There are various types of photometric schemes for AE control in image pickup apparatuses, and photometry is performed with different weights provided according to respective regions in a shooting view angle. In this case, for example, in automatic exposure control mode, generally, what is called center-weighted photometry in which a center of a screen is more weighted or photometry in which a region determined to be a main object is more weighted is performed. Therefore, upon occurrence of, e.g., change in shooting direction, change in position of the main object or change in shooting range by, e.g., zooming, a photometric value changes, resulting in change in brightness of the image shot under the AE control.

On the other hand, humans have a wide dynamic range of vision as well as a view field that is wider than a standard view angle of digital cameras, and thus, none of particular regions and main objects in the view field is more weighted for brightness adjustment, and even upon occurrence of, e.g., change in eye direction or change in positions of the main objects, there is almost no change in brightness observed.

SUMMARY OF THE INVENTION

An image pickup apparatus according to an aspect of the present invention includes: an image pickup device; an AE control section that sets an exposure condition and performs exposure control; an image pickup control section that makes the image pickup device perform shooting and generate image data, according to the exposure control performed by the AE control section; an electronic display section for image observation from a distant position without looking thereinto; and an electronic viewfinder for image observation by looking thereinto, and the electronic display section and the electronic viewfinder are configured so as to alternatively display an image relating to the image data, and in the exposure control, the AE control section sets a first exposure condition that is the same as an exposure condition for capturing image data for recording when the image is displayed on the electronic display section, and sets a second exposure condition that is different from the first exposure condition when the image is displayed on the electronic viewfinder.

An image pickup method according to an aspect of the present invention is an image pickup method in an image pickup apparatus that includes an image pickup device, an AE control section that sets an exposure condition and performs exposure control, an image pickup control section that makes the image pickup device perform shooting and generate image data, according to the exposure control performed by the AE control section, an electronic display section for image observation from a distant position without looking thereinto, and an electronic viewfinder for image observation by looking thereinto, the electronic display section and the electronic viewfinder being configured so as to alternately display an image relating to the image data, wherein in the exposure control, the AE control section sets a first exposure condition that is the same as an exposure condition for capturing image data for recording when the image is displayed on the electronic display section, and sets a second exposure condition that is different from the first exposure condition when the image is displayed on the electronic viewfinder.

DETAILED DESCRIPTION OF THE PREFERRED EMBODIMENT

An embodiment of the present invention will be described below with reference to the drawings.

Embodiment 1

Figure 1:
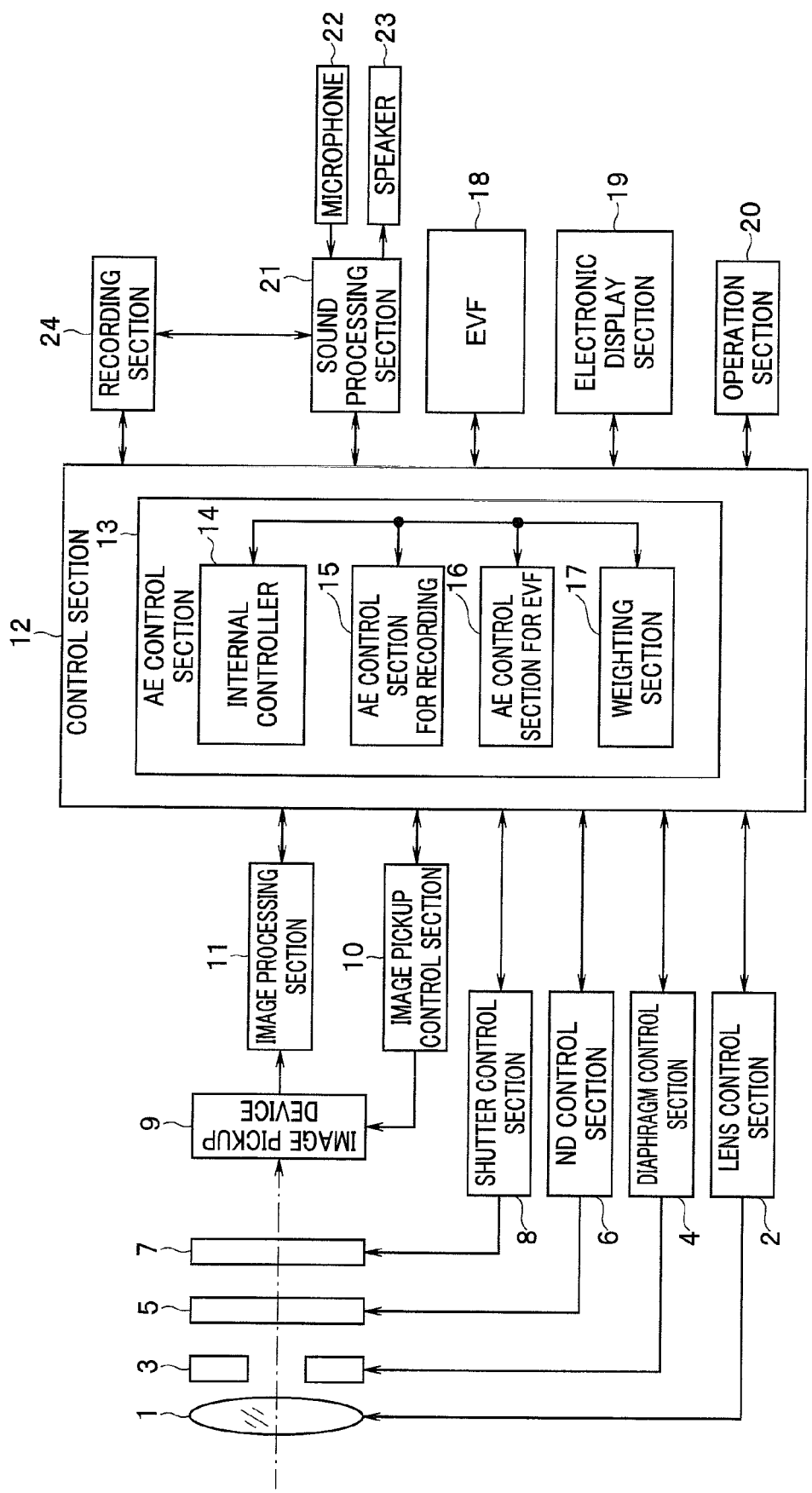
FIG. 1 is a block diagram illustrating a configuration of an image pickup apparatus according to Embodiment 1 of the present invention.

FIGS. 1 to 6 illustrate Embodiment 1 of the present invention, and FIG. 1 is a block diagram illustrating a configuration of an image pickup apparatus.

The image pickup apparatus includes a taking lens 1, a lens control section 2, a diaphragm 3, a diaphragm control section 4, an ND filter 5, an ND control section 6, a shutter 7, a shutter control section 8, an image pickup device 9, an image pickup control section 10, an image processing section 11, a control section 12, an electronic viewfinder (EVF) 18, an electronic display section 19, an operation section 20, a sound processing section 21, a microphone 22, a speaker 23 and a recording section 24.

The taking lens 1 is an image pickup optical system for forming an optical image of an object on the image pickup device 9.

The lens control section 2, based on an instruction from the control section 12, drives the taking lens 1 to adjust a focal position, and if the taking lens 1 is a power zoom lens or the like, further changes a focal length.

The diaphragm 3 is an optical diaphragm that controls a passage range of a light flux passing through the taking lens 1.

The diaphragm control section 4 drives the diaphragm 3 to change an aperture diameter, based on an instruction from the control section 12. The driving of the diaphragm 3 changes brightness of an optical image of an object and also changes, e.g., a size of blurring.

The ND (neutral density) filter 5 is configured so that the ND filter 5 can be inserted to or removed from an optical path of a light flux passing through the taking lens 1, and is a neutral density filter that if the ND filter 5 is inserted to the optical path, reduces an amount of light reaching the image pickup device 9 with almost no color balance change.

The ND control section 6, based on an instruction from the control section 12, performs drive control to insert the ND filter 5 to the optical path or withdraw the ND filter 5 from the optical path.

The shutter 7 controls a time period for the light flux from the taking lens 1 to reach the image pickup device 9 (also referred to as exposure time period or shutter speed), and is, for example, a mechanical shutter configured to run a shutter curtain. However, a device shutter may be used instead of the mechanical shutter or both a mechanical shutter and a device shutter may be used.

The shutter control section 8 controls driving of the shutter 7 based on an instruction from the control section 12.

The image pickup device 9 performs photoelectric conversion of the optical image of the object formed via the taking lens 1 and the diaphragm 3 (and the ND filter 5 as necessary) to generate image signals. The image pickup device 9 is configured, for example, as a single image pickup device in which a Bayer array color filter is arranged on a front surface of a plurality of pixels arrayed in a vertical direction and a horizontal direction. However, it should be understood that the image pickup device 9 is not limited to a single image pickup device, and the image pickup device 9 may be, for example, a stack-type image pickup device in which color components are separately provided in a substrate thickness direction or an image pickup device having another configuration.

The image pickup control section 10, based on an instruction from the control section 12, performs drive control to subject the image pickup device 9 to exposure to generate an image and makes the image pickup device 9 output the image. Here, the image pickup control section 10 makes the image pickup device 9 perform shooting and generate image data, according to exposure control performed by the AE control section 13.

The image processing section 11, based on an instruction from the control section 12, performs various types of image processing based on a set sensitivity value (SV value) such as signal amplification processing, optical black (OB) subtraction processing, white balance (WB) processing, synchronization processing, color reproduction processing, tone conversion processing, edge enhancement processing and noise reduction processing, on the image outputted from the image pickup device 9.

The control section 12 comprehensively controls operation of the entire image pickup apparatus. The control section 12 includes an AE control section 13 that sets an exposure condition and performs exposure control. Here, the AE control section 13 includes an internal controller 14, an AE control section for recording 15, an AE control section for EVF 16, and a weighting section 17.

The internal controller 14 controls the AE control section for recording 15, the AE control section for EVF 16, and the weighting section 17. The internal controller 14 performs control to, if an image is displayed on the electronic display section 19, make the weighting section 17 perform weighting for recording in terms of photometry and make the AE control section for recording 15 perform exposure control, and if an image is displayed on the electronic viewfinder 18, make the weighting section 17 perform weighting for the EVF 18 in terms of photometry and make the AE control section for EVF 16 perform exposure control.

The AE control section for recording 15 sets a first exposure condition, which is the same as an exposure condition for capturing image data for recording, which is to be recorded onto the shooting recording section 24.

The AE control section for EVF 16 sets a second exposure condition, which is different from the first exposure condition for recording. In general, display on an optical finder is display with an infinite frame rate and no brightness adjustment or the like performed according to a luminance of an object, in comparison to electronic image display. Therefore, the second exposure condition is an exposure condition that enables provision of an image of a display mode that is closer to display on an optical finder relative to the first exposure condition. More specifically, as will be described in detail later, the second exposure condition is an exposure condition in which change in brightness of an image hardly occurs due to change in, e.g., position of a main object, shooting direction or position to be zoomed and the frame rate is not lowered below a predetermined value, in comparison with the first exposure condition.

The weighting section 17, when a BV value (object luminance value) is calculated based on the brightness of the image (more specifically, a luminance value of the image data) obtained from the image pickup device 9, performs weighting according to regions of the image. Therefore, the AE control section for recording 15 controls the exposure based on the weights set by the weighting section 17 for recording (recorded image) and the brightnesses of images in the weighted regions. On the other hand, the AE control section for EVF 16 controls the exposure based on the weights set by the weighting section 17 for the EVF 18 and the brightnesses of images in the weighted regions.

The electronic viewfinder (EVF) 18 is a display section (eyepiece-type display apparatus) for observing an image by looking thereinto via an eyepiece lens or the like, and is disposed, for example, in such a manner that an observation window is positioned at an upper portion on the back face side of the image pickup apparatus.

The electronic display section 19 is an display section for observing an image from a distant position without looking thereinto (exterior-type display apparatus arranged in an exterior surface of the image pickup apparatus), and is, for example, a back-face monitor disposed below the electronic viewfinder 18 on the back face side of the image pickup apparatus.

Here, the electronic display section 19 and the electronic viewfinder 18 are configured to alternatively display an image relating to the image data processed by the image processing section 11 for display, that is, if one of the electronic display section 19 and the electronic viewfinder 18 is on, the other is off.

The operation section 20 is provided for various operational inputs to the image pickup apparatus, and includes, e.g., a power supply button for turning on/off the power supply of the image pickup apparatus, a release button for providing an instruction to start image shooting, a replay button for replaying a recorded image, a menu button for, e.g., making settings on the image pickup apparatus, a moving image button for performing moving image shooting, and operation buttons such as cross arrow keys used for selecting an item and an OK button used for determining a selected item. Note that whether an image is provided on the electronic display section 19 or the electronic viewfinder 18 can be selected by, for example, operating, e.g., the menu button, the cross arrow keys and/or the OK button (it should be understood that a dedicated button or the like may be provided). Then, upon the operation section 20 being operated, a signal according to the content of the operation is outputted to the control section 12.

The sound processing section 21 shapes a waveform of an analog sound signal generated by the microphone 22 to convert the analog sound signal into a digital signal, and performs compression processing on the digital signal as necessary, and performs expansion processing, as necessary, on sound data to be replayed to convert the sound data into an analog sound signal and outputs the analog sound signal to the speaker 23.

The microphone 22 converts input sound into an analog electric signal (sound signal). In recording a moving image, sound data is acquired via the microphone 22.

The speaker 23 generates sound based on an analog electric signal (sound signal) supplied from the sound processing section 21. At the time of moving image replay, sound is replayed via the speaker 23, and furthermore, e.g., a warning tone relating to the image pickup apparatus is generated as necessary.

The recording section 24 records image data processed by the image processing section 11 for recording, and records sound data or other data, etc., and, for example, is formed by, e.g., a memory card that is attachable/detachable to/from the image pickup apparatus. Therefore, the recording section 24 does not need to be a component inherent to the image pickup apparatus.

Next, processing in the image pickup apparatus will be described according to FIG. 6, with reference to FIGS. 2 to 5. Here, FIG. 6 is a flowchart illustrating processing in the image pickup apparatus.

The processing is started when the power supply button of the image pickup apparatus is turned on, and whether or not the power should be turned off (step S1). The power is turned off, for example, when the power supply button is turned off, or when automatic power-off in power saving settings is set and a period of time in which no operation is performed has reached a predetermined period of time.

If the power is not turned off here, whether or not display is provided by the electronic display section 19 formed by, e.g., a back-face monitor (step S2).

Figure 2:
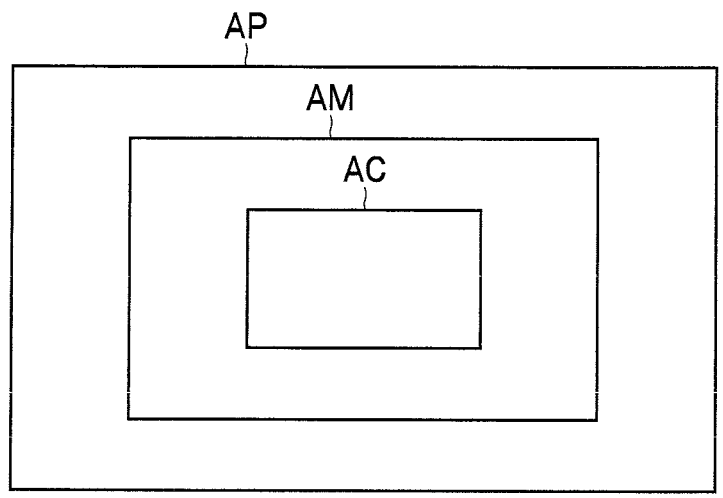
FIG. 2 is a diagram illustrating an example of a photometric region used when display is provided on an electronic display section in Embodiment 1 above.

If display is provided by the electronic display section 19 here, the internal controller 14 makes the weighting section 17 set weights for photometric regions, for example, such as those illustrated in FIG. 2, and based on the set weights and a luminance value of an acquired image, makes the AE control section for recording 15 calculate a BV value for recording (and thus for the electronic display section 19) (step S3).

Here, FIG. 2 is a diagram illustrating an example of photometric regions used for providing display on the electronic display section 19.

Among the photometric regions for recording (for the electronic display section 19) such as those illustrated in FIG. 2, for example, a central region AC of the image is weighted most, a near-center region AM around the central region AC is weighted to a medium level, and a peripheral region AP around the near-center region AM is weighted to be lowest.

Then, the AE control section for recording 15 performs weighting of the luminance value of the image obtained from the image pickup device 9 in such a manner as illustrated in FIG. 2 (that is, weighting so as to make a weight of a first region including a central portion of the image (for example, the central region AC) larger than those of regions other than the first region) as a first exposure condition to calculate a BV value. Accordingly, the calculated BV value is relatively largely affected by a luminance of an object positioned in the central region AC. In other words, change in position of a main object, change in shooting direction, or change in shooting range due to, e.g., zooming results in change in the calculated BV value.

Note that although center-weighted photometry such as illustrated in FIG. 2 has been described here as an example, the present invention is not limited to such example and, for example, adaptive photometry regions resulting from a main object being detected from an image and providing heavy weight with the detected main object as a center may be used.

Figure 3:
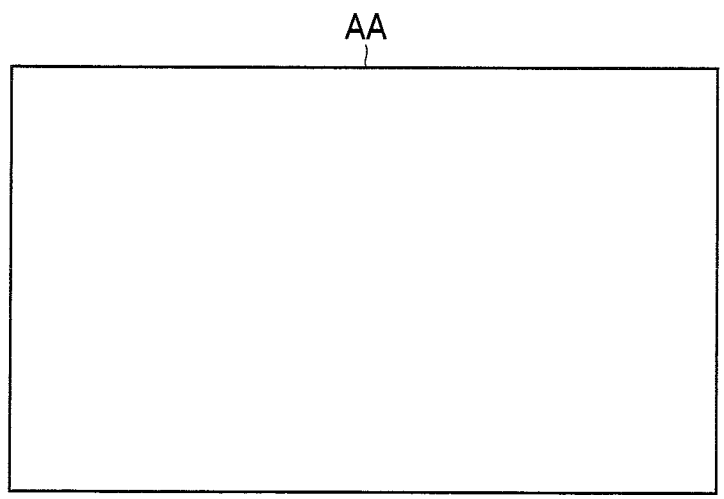
FIG. 3 is a diagram illustrating an example of a photometric region used when display is provided on an electronic viewfinder in Embodiment 1 above.

On the other hand, if display is not provided by the electronic display section 19, that is, display is provided by the electronic viewfinder (EFV) 18 in step S2, the internal controller 14 makes the weighting section 17 set a weight for a photometry region, for example, such as illustrated in FIG. 3 and makes the AE control section for EVF 16 calculate a BV value (object luminance value) for EVF 18 based on the set weight and the luminance of the acquired image (step S6).

Here, FIG. 3 is a diagram illustrating an example of a photometric region used when display is provided on the electronic viewfinder 18.

A photometric region for the electronic viewfinder 18 such as illustrated in FIG. 3, for example, is weighted so that an entire region AA of the image is uniformly weighted.

Then, the AE control section for EVF 16 is configured to equally deal with luminance values of the image data obtained from the image pickup device 9 irrespective of the pixel positions as illustrated in FIG. 3 to calculate a BV value, as a second exposure condition.

Note that although averaging photometry in which weights of all pixels are equal to one another such as illustrated in FIG. 3 has been described as an example, the present invention is not limited to such example, any appropriate photometric scheme can be used as long as such scheme is hardly affected by change in, e.g., a position of a main object, a shooting direction and/or a position to be zoomed. For example, if an example is taken from the perspective of the effect on the calculated BV value being smaller than that of the center-weighted photometry illustrated in FIG. 2, center-weighted photometry in which, for example, a central region AC has a size that is larger than that illustrated in FIG. 2 (that is, a second region that is larger than a first region including a central portion of the image is largely weighted relative to the regions other than the second region) may be employed (however, it should be understood that it is more preferable as the effect on the calculated BV value is further smaller).

Figure 4:
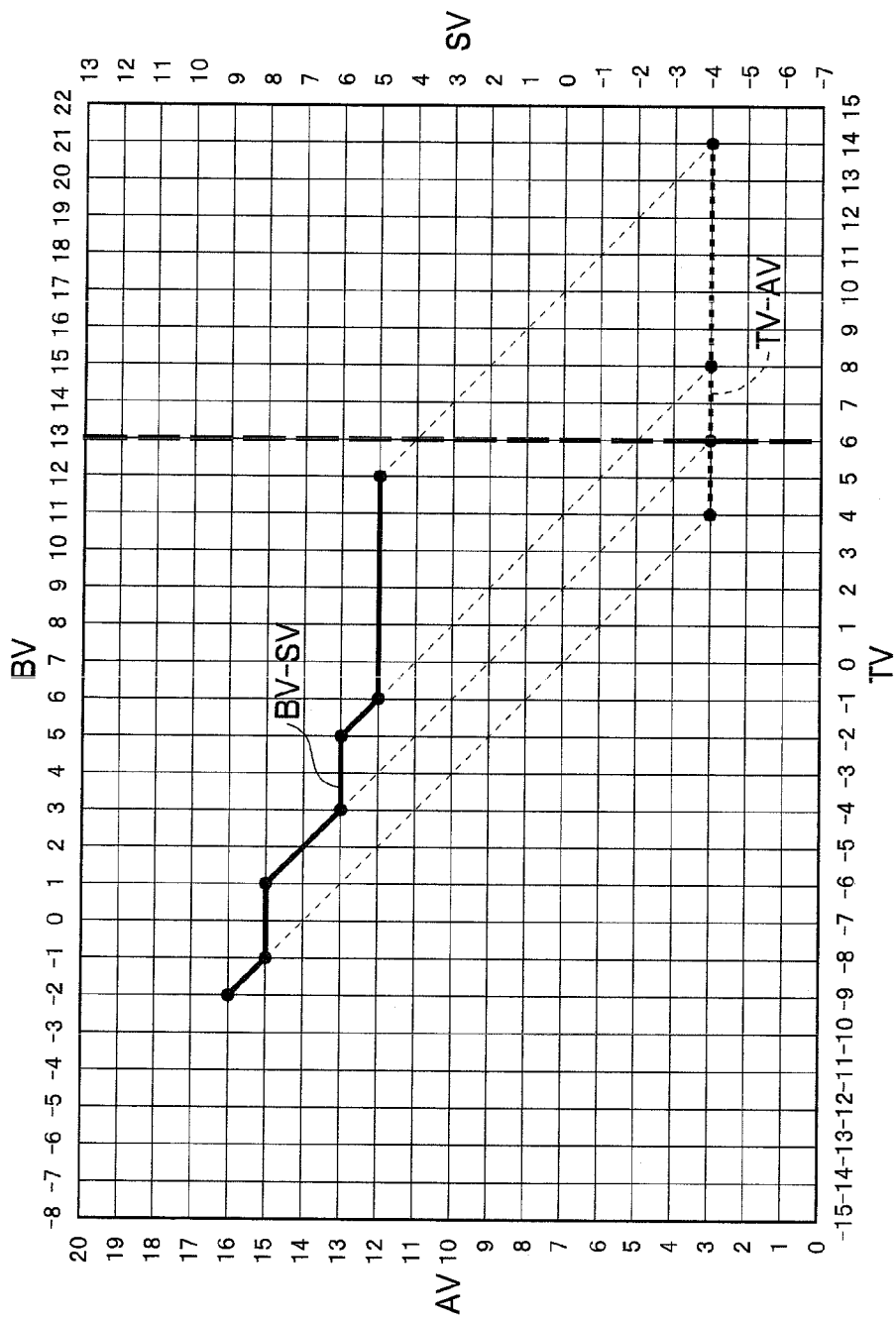
FIG. 4 is a diagram illustrating an example of a program diagram used when display is provided on the electronic display section in Embodiment 1 above.

Also, upon end of the processing in step S3, the internal controller 14 selects a program diagram for recording (and thus for the electronic display section 19 formed by, e.g., a back-face monitor), for example, such as illustrated in FIG. 4 (step S4). Here, FIG. 4 is a diagram illustrating an example of a program diagram used when display is provided on the electronic display section 19.

Figure 5:
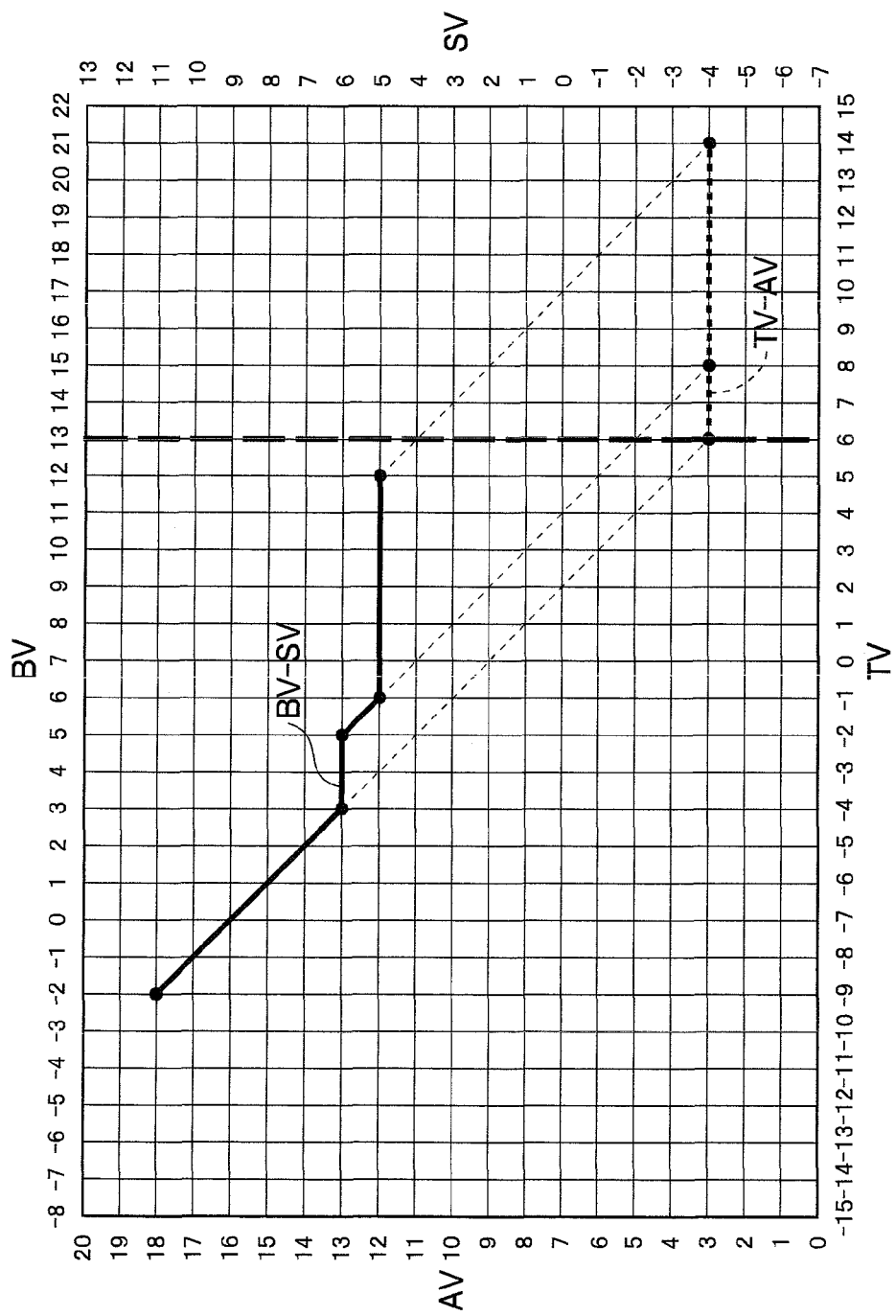
FIG. 5 is a diagram illustrating an example of a program diagram used when display is provided on the electronic viewfinder in Embodiment 1 above.
Figure 6:
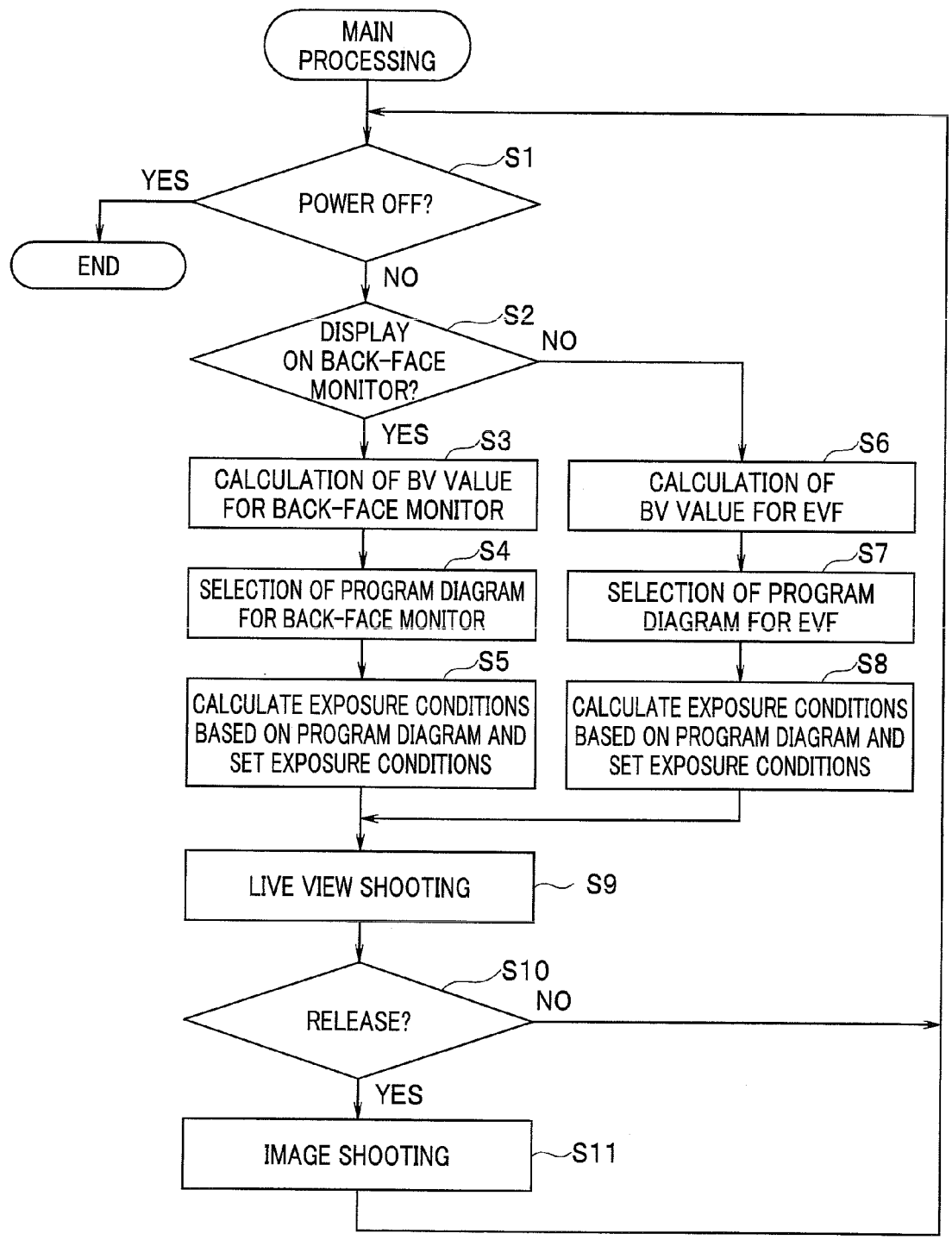
FIG. 6 is a flowchart illustrating processing in the image pickup apparatus according to Embodiment 1 above.

On the other hand, upon end of the processing in step S6, the internal controller 14 selects a program diagram for the EVF 18, for example, such as illustrated in FIG. 5 (step S7). Here, FIG. 5 is a diagram illustrating an example of a program diagram when display is provided on the electronic viewfinder 18.

The program diagram illustrated in FIG. 5 is a program diagram in which a TV value (shutter speed value) provides a high speed that is equal to or exceeds the reciprocal of the display frame rate of the image (see the thick dotted line). In other words, assuming that a display frame rate of an image is, for example, 60 (fps), a time period corresponding to the display frame rate is 1/60 (seconds), and furthermore, a TV value corresponding to this time period is approximately 6 (more exactly, approximately 5.9). Therefore, in the program diagram illustrated in FIG. 5, a graph not including a TV value of less than 6 is used.

Next, if a program diagram such as illustrated in FIG. 4 is selected by the processing in step S4, the internal controller 14 makes the AE control section for recording 15 derive other exposure conditions, that is, an SV value (sensitivity value), a TV value (shutter speed value) and an AV value (diaphragm value) based on the selected program diagram and the BV value calculated in step S3, and performs exposure control by making, e.g., the diaphragm control section 4, the ND control section 6, the shutter control section 8, the image pickup control section 10 and the image processing section 11 to make settings based on the derived exposure conditions (step S5).

In other words, using the BV value calculated for recording in step S3, the AE control section for recording 15 acquires an SV value corresponding to the BV value with reference to the BV-SV graph in FIG. 4. Furthermore, the AE control section for recording 15 acquires a TV value and an AV value for an EV value determined from the BV value and the SV value (in the program diagram illustrated in FIG. 4, a line on which the EV value is constant is a line with an angle of 45° extending from the upper left to the lower right) with reference to the TV-AV graph in FIG. 4.

As a specific example, it is assumed that a BV value of 5 is obtained in step S3. Then, a SV value of 6 is obtained with reference to the BV-SV graph. Furthermore, a point in the TV-AV graph that intersects a point of (BV, SV)=(5, 6) along a line that is diagonally right down at an angle of 45° is obtained, whereby (TV, AV)=(8, 3) is obtained.

Based on the respective values obtained as described above, the AE control section for recording 15 performs exposure control.

On the other hand, if a program diagram such as illustrated in FIG. 5 is selected as a result of the processing in step S7, the internal controller 14 makes the AE control section for EVF 16 derive an SV value, a TV value and an AV value based on the selected program diagram and the BV value calculated in step S6, and performs exposure control by making, e.g., the diaphragm control section 4, the ND control section 6, the shutter control section 8, the image pickup control section 10 and the image processing section 11 make settings based on the derived exposure conditions (step S8). A procedure in this case is similar to step S5 described above.

As described above, the AE control section 13 controls exposure based on exposure conditions derived from a program diagram, and if an image is displayed on the electronic viewfinder 18, controls the exposure based on a program diagram that provides a high shutter speed that is equal to or exceeds the reciprocal of a display frame rate of the image.

Upon end of the processing in step S5 or step S8, live view shooting based on the set exposure conditions is performed (step S9).

Subsequently, whether or not the release button in the operation section 20 is operated is determined (step S10), and if the release button is operated, an image is shot (step S11).

Upon end of the shooting in step S11 or if it is determined in step S10 that the release button is not operated, the processing returns to step S1 described above to determine whether or not the power should be turned off, and if it is determined that the power should be turned off here, the processing ends.

According to Embodiment 1 described above, in the image pickup apparatus including the electronic display section 19 and the electronic viewfinder 18, the first exposure condition, which is the same as an exposure condition for capturing image data for recording is set when an image is displayed on the electronic display section 19, and the second exposure condition, which is different from the first exposure condition, is set when an image is displayed on the electronic viewfinder 18, enabling observation of an image that gives less feeling of strangeness according to which display section from among the plurality of display sections to use.

In this case, the second exposure condition is set to be an exposure condition that enables provision of an image of a display mode that is closer to display on an optical finder relative to the first exposure condition, enabling brightness of an image observed by the electronic viewfinder 18 to be closer to brightness of an image observed by an optical finder to reduce a feeling of strangeness.

Furthermore, when an image is displayed on the electronic viewfinder 18, the shutter speed is made high to be equal to or exceed the reciprocal of a display frame rate of the image, and thus, no awkwardness in motion of an image occurs as opposed to a case where an image acquisition rate is less than the display frame rate, enabling observation of an image that gives no feeling of strangeness and smoothly moves.

In addition, as the first exposure condition, a weight of a first region including a central portion of the image is made to be larger than those of the regions other than the first region, and as the second exposure condition, a weight of a second region that is wider than the first region including the central portion of the image is made to be larger than those of the regions other than the second region or all regions of the image are uniformly weighted, whereby stable AE control can be performed in observation through the electronic viewfinder 18 and even if there is change in, e.g., position of a main object, shooting direction and position to be zoomed, the brightness of an image observed through the electronic viewfinder 18 hardly changes, enabling AE control that gives reduced feeling of strangeness and is close to human vision to be performed.

Note that although the above description has been provided mainly in terms of an image pickup apparatus, the present invention may be applied to, e.g., an image pickup method in which operation that is similar to that of an image pickup apparatus is performed, a program that makes a computer to perform operation that is similar to that of an image pickup apparatus or a recording medium that records the program, can be read by a computer and is not temporal.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image pickup apparatus comprising:
   an image pickup device;
   an AE control section that sets an exposure condition and performs exposure control;
   an image pickup control section that makes the image pickup device perform shooting and generate image data, according to the exposure control performed by the AE control section;
   an electronic display section for image observation from a distant position without looking thereinto; and
   an electronic viewfinder for image observation by looking thereinto, wherein
   the electronic display section and the electronic viewfinder are configured so as to alternatively display an image relating to the image data, and in the exposure control, the AE control section sets a first exposure condition that is the same as an exposure condition for capturing image data for recording when the image is displayed on the electronic display section, and sets a second exposure condition that is different from the first exposure condition when the image is displayed on the electronic viewfinder, and wherein the second exposure condition is an exposure condition that enables provision of an image of a display mode that is closer to display on an optical finder relative to the first exposure condition.

2. The image pickup apparatus according to claim 1, wherein the AE control section controls exposure based on an exposure condition derived from a program diagram, and when the image is displayed on the electronic viewfinder, controls exposure based on a program diagram that provides a high shutter speed that is equal to or exceeds a reciprocal of a display frame rate of the image.

3. The image pickup apparatus according to claim 1, wherein the AE control section includes a weighting section that performs weighting according to a region of the image and controls exposure based on a weight set by the weighting section and brightness of an image of the region provided with the weight, makes a weight of a first region including a central portion of the image larger than a weight of a region other than the first region as the first exposure condition, and makes a weight of a second region that is wider than the first region including the central portion of the image larger than a weight of a region other than the second region or makes weights of all of the regions of the image uniform as the second exposure condition.

4. An image pickup method in an image pickup apparatus that includes an image pickup device, an AE control section that sets an exposure condition and performs exposure control, an image pickup control section that makes the image pickup device perform shooting and generate image data, according to the exposure control performed by the AE control section, an electronic display section for image observation from a distant position without looking thereinto, and an electronic viewfinder for image observation by looking thereinto, the electronic display section and the electronic viewfinder being configured so as to alternately display an image relating to the image data,
   wherein in the exposure control, the AE control section sets a first exposure condition that is the same as an exposure condition for capturing image data for recording when the image is displayed on the electronic display section, and sets a second exposure condition that is different from the first exposure condition when the image is displayed on the electronic viewfinder, and
   wherein the second exposure condition is an exposure condition that enables provision of an image of a display mode that is closer to display on an optical finder relative to the first exposure condition.

* * * * *